United States Patent
Ge et al.

(10) Patent No.: US 8,059,278 B2
(45) Date of Patent: Nov. 15, 2011

(54) OPTICAL WAVE INTERFERENCE MEASURING APPARATUS

(75) Inventors: Zongtao Ge, Saitama (JP); Hideo Kanda, Saitama (JP); Takayuki Saito, Saitama (JP); Noboru Koizumi, Saitama (JP)

(73) Assignee: Fujinon Corporation, Saitama (JP)

( * ) Notice: Subject to any disclaimer, the term of this patent is extended or adjusted under 35 U.S.C. 154(b) by 69 days.

(21) Appl. No.: 12/578,997

(22) Filed: Oct. 14, 2009

(65) Prior Publication Data
US 2010/0091299 A1 Apr. 15, 2010

(30) Foreign Application Priority Data

Oct. 15, 2008 (JP) ................ P2008-266662

(51) Int. Cl.
*G01B 11/02* (2006.01)
(52) U.S. Cl. .......................................... 356/511
(58) Field of Classification Search .............. 356/479, 356/497, 495, 511, 496
See application file for complete search history.

(56) References Cited

U.S. PATENT DOCUMENTS

| | | | |
|---|---|---|---|
| 5,706,086 A | 1/1998 | LaFleur | |
| 6,956,657 B2 | 10/2005 | Golini et al. | |
| 7,728,987 B2 * | 6/2010 | Arnold et al. | 356/511 |
| 2003/0117632 A1 | 6/2003 | Golini et al. | |
| 2010/0097619 A1 * | 4/2010 | Ge et al. | 356/511 |

FOREIGN PATENT DOCUMENTS

| | | |
|---|---|---|
| EP | 1324006 A1 | 7/2003 |
| JP | 62-126305 A | 6/1987 |
| JP | 2004-286561 A | 10/2004 |
| WO | 2006/020776 A2 | 2/2006 |

OTHER PUBLICATIONS

European Search Report issued Feb. 11, 2010, in counterpart European Application No. 09013004.8.
Mimura, et al. "Relative angle determinable stitching interferometry for hard x-ray reflective optics"; Review of Scientific Instruments, AIP, Melville, NY, vol. 76, No. 4, Mar. 16, 2005, pp. 45102 (1-6); XP012079328.

* cited by examiner

*Primary Examiner* — Tarifur Chowdhury
*Assistant Examiner* — Jonathan Hansen
(74) *Attorney, Agent, or Firm* — Birch, Stewart, Kolasch & Birch, LLP.

(57) ABSTRACT

The relative position of a test surface is sequentially changed from a reference position where a surface central axis is aligned with a measurement optical axis such that the measurement optical axis is sequentially moved to a plurality of annular regions obtained by dividing the test surface in a diametric direction. The test surface is rotated on a rotation axis whenever the relative position is changed. Measurement light composed of a plane wave is radiated to the rotating test surface, and a one-dimensional image sensor captures interference fringes at each of a plurality of rotational positions. The shape information of each annular region is calculated on the basis of the captured interference fringes at each rotational position, and the shape information is connected to calculate the shape information of the entire measurement region.

5 Claims, 4 Drawing Sheets

OPTICAL WAVE INTERFERENCE MEASURING APPARATUS

CROSS-REFERENCE TO RELATED APPLICATIONS

This application is based upon and claims the benefit of priority from the Japanese Patent Application No. 2008-266662 filed on Oct. 15, 2008; the entire contents of which are incorporated herein by reference.

BACKGROUND OF THE INVENTION

1. Field of the Invention

The present invention relates to an optical wave interference measuring apparatus that radiates measurement light to a test surface and measures the shape of the test surface on the basis of an interference fringe formed by interference between reference light and returning light from the test surface, and more particularly, to an optical wave interference measuring apparatus suitable for a test surface that is rotationally symmetric and has a complicated shape.

2. Description of the Related Art

A method has been proposed which radiates spherical waves to an aspheric test surface and specifies the shape of the test surface on the basis of an interference fringe formed by interference between the reference light and the returning light from the test surface. However, it is difficult to obtain an interference fringe corresponding to the entire test surface using this method.

Therefore, a method has been proposed which sequentially moves an interferometer or a test surface in a measurement optical axis direction to sequentially generate an interference fringe corresponding to each partial region of the test surface in the diametric direction thereof, analyzes each of the interference fringes to calculate the shape of each partial region of the test surface in the diametric direction, and connects the shapes to specify the shape of the entire test surface (see JP-A-62-126305).

In addition, a method has been proposed which sequentially moves an interferometer or a test surface in a plane perpendicular to the measurement optical axis, enlarges an interference fringe corresponding to each partial region of the test surface to a size that can be analyzed whenever the movement is performed, captures the enlarged interference fringes, analyzes each of the interference fringes to calculate the shape of each partial region of the test surface, and connects the shapes to specify the shape of the entire test surface (see U.S. Pat. No. 6,956,657).

In recent years, the shape of aspheric lenses has become complicated, and aspheric lenses have been used in which both a concave portion (concave surface portion) and a convex portion (convex surface portion) each having the optical axis (central axis) of the lens surface as its center are formed in one lens surface. It is difficult to measure the shape of the test surface having the concave surface portion and the convex surface portion using an optical interferometer. Therefore, the shape of the test surface has been measured by a three-dimensional shape measuring method using an optical probe.

For example, the reason why it is difficult to measure the shape of the test surface using the optical interferometer is that the concave surface portion and the convex surface portion have opposite gradients with respect to the optical axis of the test surface (when the test surface faces upward, the gradient of the concave surface portion is reduced toward the optical axis, and the gradient of the convex surface portion is increased toward the optical axis). That is, in a general optical interference measurement method, an appropriate interference fringe is obtained from only the region in which measurement light radiated to the test surface is retro-reflected from the test surface (returning light travels through the original optical path in the opposite direction). In the methods disclosed in JP-A-62-126305 and U.S. Pat. No. 6,956,657 in which the measurement light radiated to the test surface is fixed to a spherical wave that travels along the measurement optical axis while diverging or a spherical wave that travels along the measurement optical axis while converging, the returning light from the test surface travels in different directions in the concave surface portion and the convex surface portion. Therefore, it is difficult to obtain appropriate interference fringes from both the concave surface portion and the convex surface portion.

In addition, an interferometer using a plane wave as the measurement light is generally known. In a test surface having a complicated shape, there is a large variation in the inclination of each partial region of the test surface. Therefore, when each partial region of the test surface is measured while the direction of measurement light radiated to the test surface is changed, the density of the obtained interference fringes is excessively high. Therefore, it is difficult for a general two-dimensional image sensor to analyze the interference fringes with high accuracy since the resolution of the two-dimensional image sensor is too low.

SUMMARY OF THE INVENTION

The invention has been made in order to solve the above-mentioned problems, and an object of the invention is to provide an optical wave interference measuring apparatus capable of accurately measuring the shape of a test surface that is rotationally symmetric and has a complicated shape.

In order to achieve the object, the optical wave interference measuring apparatus according to the invention has the following structure.

According to an aspect of the invention, there is provided an optical wave interference measuring apparatus for measuring the shape of a rotationally symmetric test surface of a test object arranged on a measurement optical axis. The optical wave interference measuring apparatus includes: a test surface position adjusting unit that sequentially changes the position of the test surface relative to the measurement optical axis from a reference position where a surface central axis of the test surface is aligned with the measurement optical axis such that an intersection between the measurement optical axis and the test surface is sequentially moved to a plurality of annular regions obtained by dividing the test surface in a diametric direction in a virtual plane including the measurement optical axis and the surface central axis and the measurement optical axis is perpendicular to the tangent plane of the test surface at the intersection whenever the intersection is moved; a test surface rotating unit that rotates the test surface on a rotation axis with the surface central axis aligned with the rotation axis, whenever the relative position is changed; an interference optical system that radiates measurement light, which is composed of a plane wave and travels along the measurement optical axis, to the rotating test surface and mixes reference light and returning light from the test surface to obtain interference light; an imaging system for image capture during rotation that captures the interference light at a plurality of rotational positions of the rotating test surface and uses a one-dimensional image sensor to capture an interference fringe at each rotational position which corresponds to an intersection region between the virtual plane and the test surface in each of the plurality of annular regions; and a shape analyzing unit that calculates shape information of each of the plurality of annular regions on the basis of the interference fringe at each rotational position and connects the shape information of each of the annular regions to calculate shape information of the entire combined region of the plurality of annular regions.

The optical wave interference measuring apparatus according to the above-mentioned aspect may further include: a holding unit that holds the test object at an initial position where the measurement optical axis is aligned with the rotation axis and the surface central axis is parallel to the measurement optical axis; an imaging system for image capture at the initial position that captures the interference fringes at the initial position, which are formed when the test surface rotating unit rotates the test surface disposed at the initial position on the rotation axis and the interference optical system radiates the measurement light to the rotating test surface such that the reference light interferes with the returning light from the test surface, at the plurality of rotational positions of the test surface; an axis deviation measuring unit that calculates a deviation between the measurement optical axis and the surface central axis on the basis of the interference fringes at the initial position which are captured at the plurality of rotational positions; and a test surface position pre-adjusting unit that adjusts the position of the test surface relative to the measurement optical axis such that the test surface is disposed at the reference position, on the basis of the calculated axis deviation.

The optical wave interference measuring apparatus according to the above-mentioned aspect may further include: a surface eccentricity measuring unit that calculates the surface eccentricity of the test surface on the basis of the positional relationship between the measurement optical axis and an outside diameter central axis of the test object disposed at the initial position and the axis deviation calculated by the axis deviation measuring unit.

In the optical wave interference measuring apparatus according to the above-mentioned aspect, the test surface position adjusting unit may include a tilting unit that tilts the test surface on a tilting axis perpendicular to the virtual plane.

The optical wave interference measuring apparatus having the above-mentioned structure according to the invention has the following operations and effects.

That is, in the optical wave interference measuring apparatus according to the above-mentioned aspect of the invention, whenever the position of the test surface relative to the measurement optical axis is sequentially changed, the test surface is rotated on the surface central axis (rotation axis), and measurement light composed of a plane wave is radiated to the rotating test surface. A portion of the radiated measurement light is reflected from an intersection region between the test surface and the virtual plane including the measurement optical axis and the surface central axis in each of the plurality of annular regions, and the one-dimensional image sensor captures the interference fringes at each rotational position formed by interference light between the returning light and the reference light. The shape information of each annular region is calculated on the basis of the captured interference fringes at each rotational position, and the shape information is connected to calculate the shape information of the entire region.

Even when the test surface has a complicated shape, it is possible to radiate the measurement light to each annular region substantially in the vertical direction by changing the relative position of the test surface such that the measurement optical axis is vertical to each of the plurality of annular regions. In this way, it is possible to obtain returning light retro-reflected from the intersection region in each of the annular regions. Therefore, it is possible to obtain an appropriate interference fringe at each rotational position corresponding to the intersection region.

Since the plane wave is used as the measurement light, the density of the interference fringes at each rotational position is increased when the interference fringes correspond to a narrow region of the test surface. However, even when the density of the interference fringes at each rotational position is increased, it is possible to analyze the interference fringes at each rotational position with high accuracy by using a one-dimensional image sensor having a resolution higher than that of a two-dimensional image sensor to capture the interference fringes at each rotational position.

Since a one-dimensional image sensor having an image capture speed higher than that of the two-dimensional image sensor is used, it is possible to capture the interference fringes at each rotational position while rotating the test surface. Therefore, it is possible to reduce the time required for measurement, as compared to the related art in which each partial region of the test surface is captured in a stationary state.

Therefore, according to the optical wave interference measuring apparatus of the above-mentioned aspect of the invention, it is possible to accurately measure the shape of a test surface that is rotationally symmetric and has a complicated shape in a short period of time.

DESCRIPTION OF THE PREFERRED EMBODIMENTS

Figure 1:
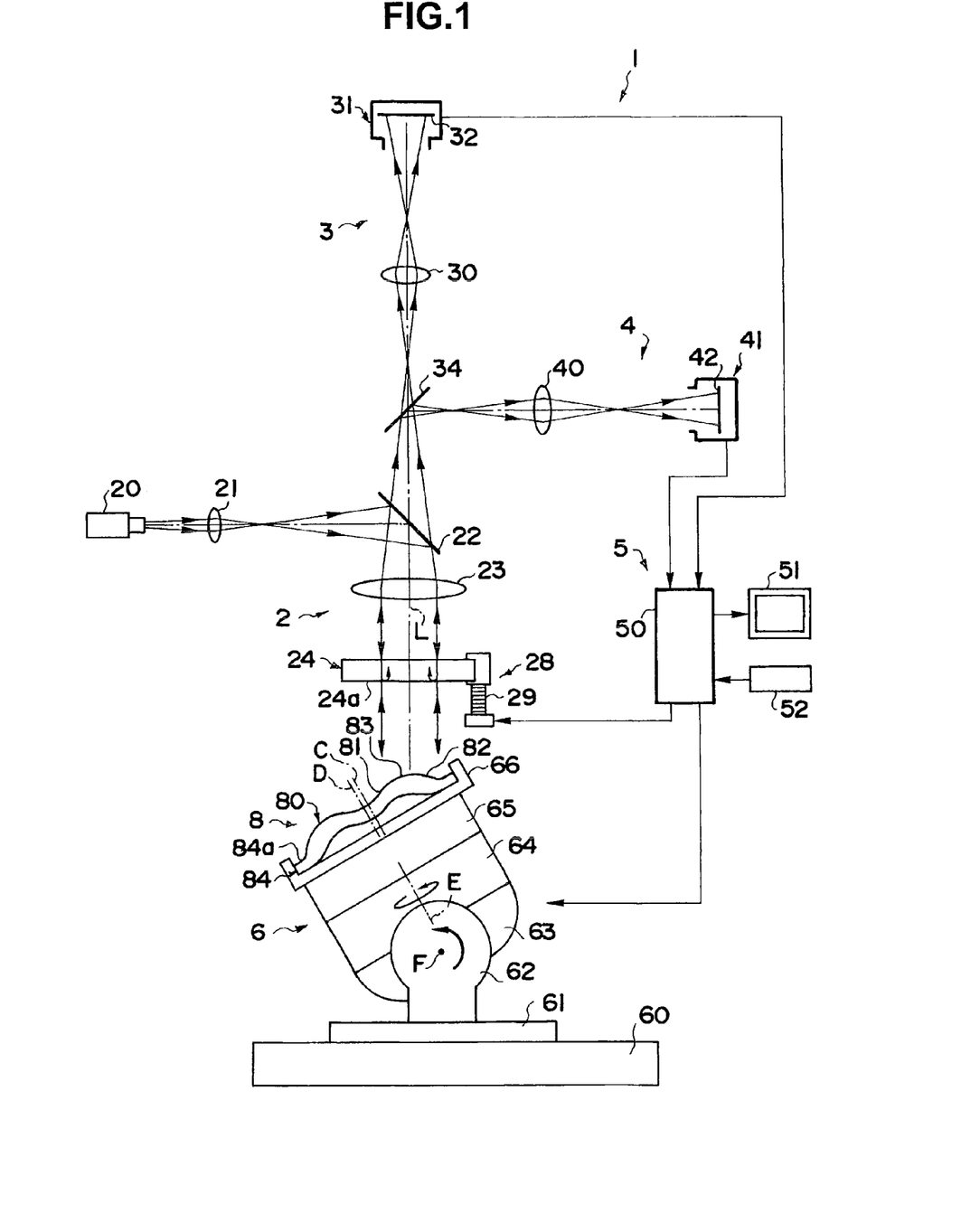
FIG. 1 is a diagram schematically illustrating the structure of an optical wave interference measuring apparatus according to an embodiment of the invention.
Figure 2:
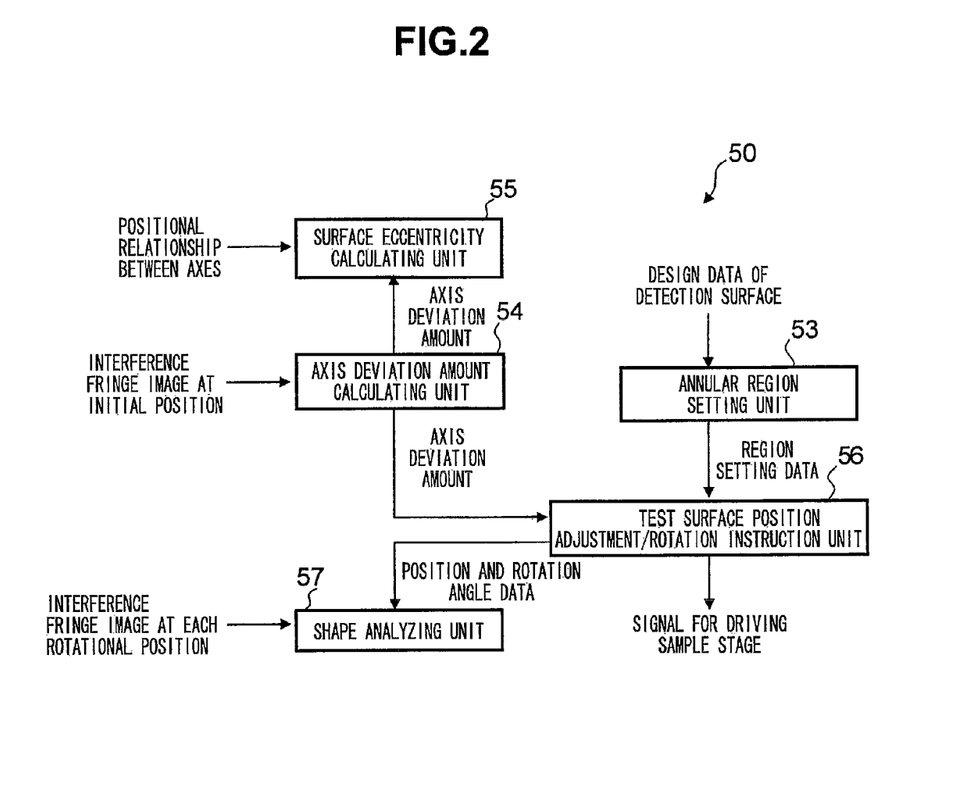
FIG. 2 is a block diagram illustrating the structure of an analysis control device shown in FIG. 1.

Hereinafter, exemplary embodiments of the invention will be described in detail with reference to the accompanying drawings. FIG. 1 is a diagram schematically illustrating the structure of an optical wave interference measuring apparatus according to an embodiment of the invention, and FIG. 2 is a block diagram illustrating the structure of an analysis control device shown in FIG. 1. The diagrams used to describe the embodiments schematically show components, but do not show the detailed shapes or structures of the components. In particular, in FIG. 1, for example, the size of each member or the distance between the members is appropriately changed.

The optical wave interference measuring apparatus 1 according to this embodiment shown in FIG. 1 measures and analyzes the shape of a test surface 80 (an upper lens surface of the test lens 8 in FIG. 1) of a test lens 8 (a test object in this embodiment) that is rotationally symmetric. The optical wave interference measuring apparatus 1 includes an interference optical system 2 that radiates measurement light to the test surface 80 and composes returning light from the test surface 80 and reference light to obtain interference light, an imaging system 3 for image capture during rotation and an imaging system 4 for image capture at an initial position that capture interference fringes formed by the interference light, a measurement analyzing system 5 that analyzes the captured interference fringes to calculate the shape of the test surface 80, and a sample stage 6 on which the test lens 8 is loaded and held.

The interference optical system 2 is a Fizeau optical system, and includes a light source unit 20 that emits high-coherence beams, a beam diameter enlarging lens 21 that enlarges the diameter of the beam emitted from the light source unit 20, a beam branching optical element 22 that reflects the beam emitted from the beam diameter enlarging lens 21 downward in FIG. 1, a collimator lens 23 that collimates the light emitted from the beam branching optical element 22, and a flat reference plate 24 that retro-reflects a portion of the plane wave emitted from the collimator lens 23 from a reference plane 24a to obtain reference light and transmits the other portion of the plane wave as measurement light along a measurement optical axis L. The flat reference plate 24 is held by a fringe scanning adaptor 28 including a piezo element 29. When fringe scanning measurement is performed, the flat reference plate 24 is finely moved in the direction of the measurement optical axis L.

The imaging system 3 for image capture during rotation captures an image when the test surface 80 is rotated, and includes an imaging lens 30 that focuses the interference light which passes through the beam branching optical element 34 and travels upward in FIG. 1 and an imaging camera 31 including a one-dimensional image sensor 32 composed of, for example, a CCD or a CMOS. The imaging lens 30 acquires image data of the interference fringes formed on the one-dimensional image sensor 32.

The imaging system 4 for image capture at an initial position mainly captures an image when the test surface 80 is disposed at an initial position (the measurement optical axis L is aligned with a rotation axis E, which will be described below, and the surface central axis C of the test surface 80 is parallel to the measurement optical axis L), and includes an imaging lens 40 that focuses the interference light reflected to the right side of FIG. 1 by the beam branching optical element 34 and an imaging camera 41 including a two-dimensional image sensor 42 composed of, for example, a CCD or a CMOS. The imaging lens 40 acquires image data of the interference fringes formed on the two-dimensional image sensor 42.

The measurement analyzing system 5 includes an analysis control device 50, which is composed of, for example, a computer, that calculates shape data of the test surface 80 on the basis of the image data of the interference fringes acquired by the one-dimensional image sensor 32 and the two-dimensional image sensor 42, calculates the surface eccentricity of the test surface 80 on the basis of the image data of the interference fringes acquired by the two-dimensional image sensor 42, or controls the driving of the sample stage 6, a display device 51 that displays the analysis result of the analysis control device 50 or images, and an input device 52 including, for example, a keyboard or a mouse.

As shown in FIG. 2, the analysis control device 50 includes an annular region setting unit 53, an axis deviation calculating unit 54, a surface eccentricity calculating unit 55, a test surface position adjustment/rotation instructing unit 56, and a shape analyzing unit 57, which are constructed by a CPU and a storage unit, such as a hard disk, provided in the analysis control device 50 and programs stored in the storage unit.

The annular region setting unit 53 sets a plurality of annular regions (which will be described in detail below), which are obtained by dividing the test surface 80 in the diametric direction, on the test surface 80 on the basis of design data of the test surface 80.

The axis deviation calculating unit 54 calculates the deviation between the measurement optical axis L and the surface central axis C of the test surface 80 on the basis of an interference fringe image at an initial position captured by the two-dimensional image sensor 42 of the imaging system 4 for image capture at an initial position when the test surface 80 is disposed at the initial position.

The surface eccentricity calculating unit 55 calculates the surface eccentricity of the test surface 80 on the basis of the axis deviation calculated by the axis deviation calculating unit 54 and the positional relationship between the outside diameter central axis D of the test lens 8 at the initial position and the measurement optical axis L.

The test surface position adjustment/rotation instructing unit 56 drives the sample stage 6 to adjust the position of the test surface 80 relative to the measurement optical axis L on the basis of the axis deviation calculated by the axis deviation calculating unit 54, such that the test surface 80 is disposed at a reference position (a position where the surface central axis C of the test surface 80 is aligned with the measurement optical axis L). In addition, the test surface position adjustment/rotation instructing unit 56 drives the sample stage 6 to sequentially change the position of the test surface 80 relative to the measurement optical axis L such that the intersection between the measurement optical axis L and the test surface 80 is sequentially moved to the plurality of annular regions set by the annular region setting unit 53 and the measurement optical axis L is perpendicular to the tangent plane of the test surface 80 at the intersection whenever the intersection is moved.

The shape analyzing unit 57 calculates shape information for each of the plurality of annular regions, on the basis of the interference fringes at each rotational position captured by the one-dimensional image sensor 32 of the imaging system 3 for image capture during rotation when the test surface 80 is rotated and data for the position and rotation angle of the test surface 80 when the interference fringe is captured at each rotational position. In addition, the shape analyzing unit 57 connects the shape information of each annular region to calculate the shape information of the entire combined region of the plurality of annular regions. In this embodiment, the axis deviation calculating unit 54 forms an axis deviation measuring unit, and the surface eccentricity calculating unit 55 forms a surface eccentricity measuring unit. In addition, the shape analyzing unit 57 forms a shape analyzer.

As shown in FIG. 1, the sample stage 6 includes a base portion 60, a first two-axis adjusting stage portion 61 that is mounted and held on the base portion 60, a tilting stage portion 62 that is mounted and held on the first two-axis adjusting stage portion 61, a rotating stage portion 64 that is held by the tilting stage portion 62 with a tilting table 63 interposed therebetween, a second two-axis adjusting stage portion 65 that is mounted and held on the rotating stage portion 64, and a test object holding portion 66 that is mounted and held on the second two-axis adjusting stage portion 65.

The first two-axis adjusting stage portion 61 moves the tilting stage portion 62 relative to the base portion 60 in the horizontal direction of FIG. 1 and a direction vertical to the plane of FIG. 1. The tilting stage portion 62 forms a tilting unit, and tilts the rotating stage portion 64 on a tilting axis F that is vertical to a virtual plane including the measurement optical axis L and the surface central axis C of the test surface through the tilting table 63. The rotating stage portion 64 rotates the second two-axis adjusting stage portion 65 on the rotation axis E that extends in parallel to the virtual plane. The second two-axis adjusting stage portion 65 moves the test object holding portion 66 relative to the rotating stage portion 64 in the plane vertical to the rotation axis E. The test object holding portion 66 stably holds the test lens 8 during rotation. The test object holding portion 66 contacts and supports the outer circumference of the test lens 8 at three points, and detects the position of the outside diameter central axis D of the test lens 8 from the positional information of the three points.

The sample stage 6 freely changes the position of the test surface 80 relative to the measurement optical axis L (the inclination of the test surface 80 relative to the measurement optical axis L and the position thereof in the plane vertical to the measurement optical axis L). In this embodiment, the sample stage 6 and the test surface position adjustment/rotation instructing unit 56 form a test surface position adjusting unit, a test surface rotating unit, a holding unit, and a test surface position pre-adjusting unit.

Figure 3A:
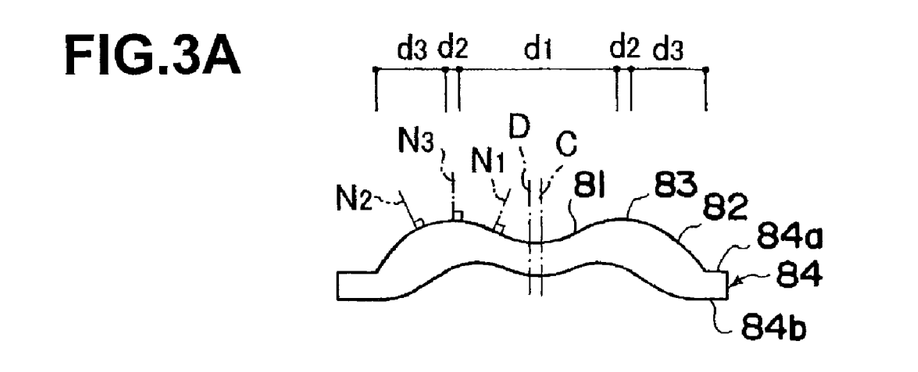
FIG. 3A is a cross-sectional view illustrating the structure of a test lens.
Figure 3B:
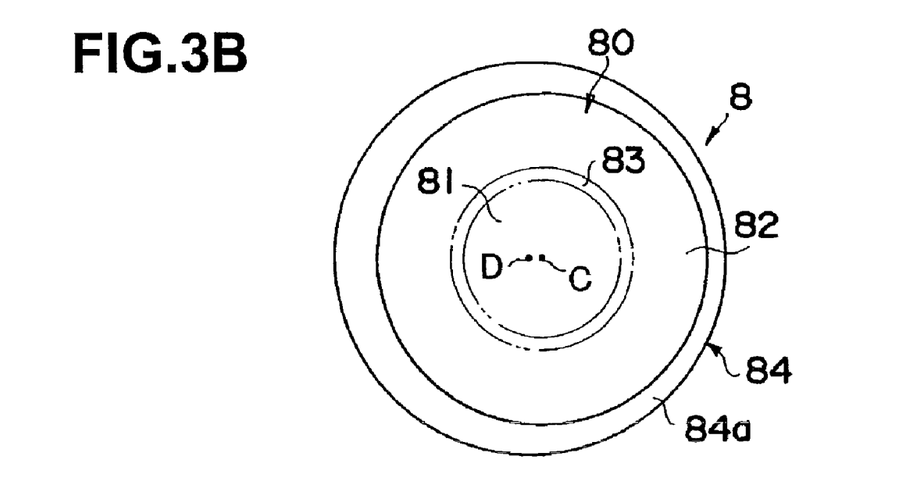
FIG. 3B is a plan view illustrating the structure of the test lens.

Next, the test lens 8 will be described. FIG. 3A and 3B are a cross-sectional view and a plan view illustrating the structure of the test lens 8, respectively.

As shown in FIGS. 3A and 3B, the test lens 8 includes the test surface 80 that is rotationally symmetric with respect to the surface central axis C. The test surface 80 includes a concave surface portion 81 that has the surface central axis C as its center and is concave to the interference optical system 2 (the upper side of FIG. 3A), a convex surface portion 82 that has the surface central axis C as its center and is convex to the interference optical system 2, and an off-axis stationary point portion 83 that is disposed at the boundary between the concave surface portion 81 and the convex surface portion 82.

The concave surface portion 81 is a region in which the gradient is lowered toward the surface central axis C, when the test surface 80 faces upward, that is, a region in which a normal line $N_1$ of the concave surface portion 81 extends so as to be close to (intersect) the surface central axis C as a point on the normal line $N_1$ becomes more distant from the concave surface portion 81. The convex surface portion 82 is a region in which the gradient is increased toward the surface central axis C, when the test surface 80 faces upward, that is, a region in which a normal line $N_2$ of the convex surface portion 82 extends away from the surface central axis C as a point on the normal line $N_2$ becomes more distant from the convex surface portion 82. Strictly, the off-axis stationary point portion 83 is a linear region in which the direction of a normal line $N_3$ of the off-axis stationary point portion 83 is aligned with (parallel to) the surface central axis C. However, in this embodiment, the off-axis stationary point portion 83 is shown as a ring-shaped region having a width $d_2$ in the drawings. Therefore, a concave region having a width (diameter) $d_1$ disposed in the inner circumference of the off-axis stationary point portion 83 is the concave surface portion 81, and a ring-shaped convex region having a width $d_3$ disposed in the outer circumference of the off-axis stationary point portion 83 is the convex surface portion 82.

The test lens 8 further includes a flange-shaped protruding portion 84 that is provided in an outer portion of the test surface 80 in the diametric direction. The protruding portion 84 is used as a positioning standard when the test lens 8 is mounted to, for example, an optical device. The protruding portion 84 has an upper surface 84a and a lower surface 84b which are vertical to the surface central axis C. In the test lens 8, the outside diameter central axis D, which is the central axis of the outside diameter of the protruding portion 84, deviates from the surface central axis C of the test surface 80 due to the relative positional deviation (molding error) between the protruding portion 84 and the test surface 80 (the outside diameter central axis D is parallel to the surface central axis C).

Figure 4:
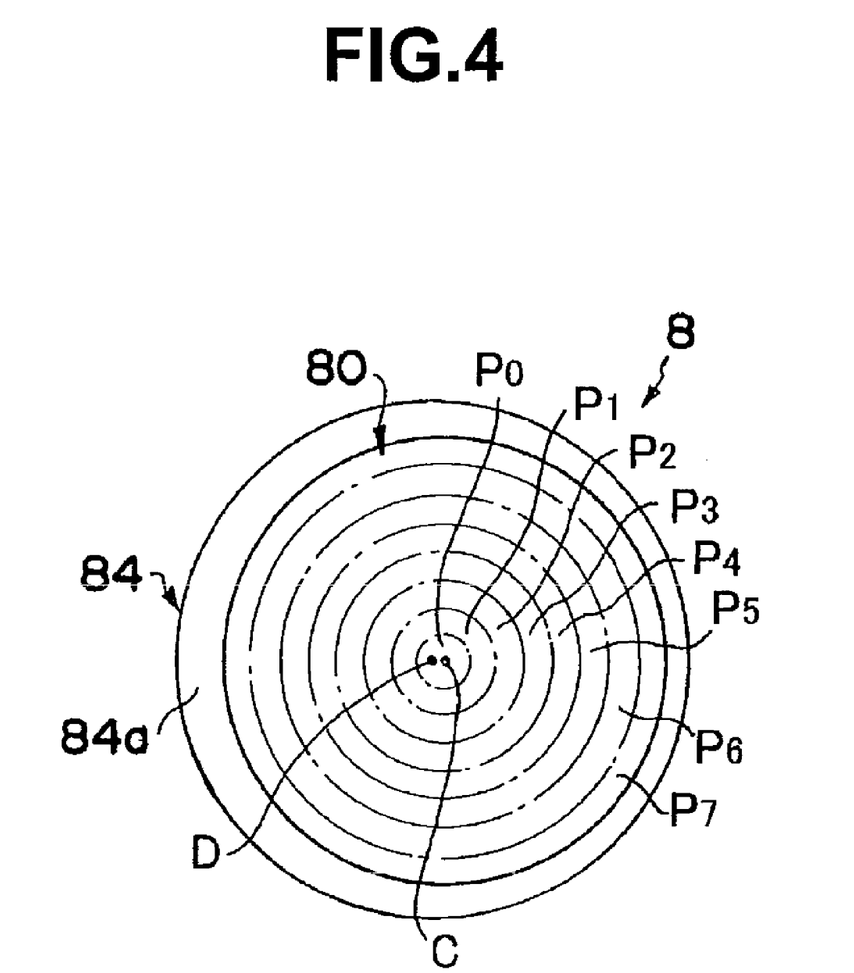
FIG. 4 is a diagram illustrating an example of a plurality of annular regions set on a test surface.

Next, the operation and the measuring process of the optical wave interference measuring apparatus 1 will be described. FIG. 4 is a diagram illustrating an example of a plurality of annular regions set on the test surface 80.

(1) First, as shown in FIG. 4, a plurality of annular regions (FIG. 4 schematically shows seven annular regions $P_1$ to $P_7$) are set on the test surface 80. The annular region setting unit 53 sets the annular regions $P_1$ to $P_7$ on the basis of the design data of the test surface 80. The annular regions $P_1$ to $P_7$ shown in FIG. 4 are just illustrative for ease of understanding of this embodiment, and the annular regions are different from ones appropriately set according to the cross-sectional shape of the test surface 80 shown in FIG. 3A (actually, the annular regions are more finely set). A disk-shaped region $P_0$ is set inside the annular region $P_1$ at the same time as the annular regions are set.

(2) Then, the sample stage 6 is used to set the test lens 8 to the initial position where the measurement optical axis L is aligned with the rotation axis E of the rotating stage portion 64 and the surface central axis C of the test surface 80 is parallel to the measurement optical axis L. In this embodiment, the first two-axis adjusting stage portion 61 and the tilting stage portion 62 are driven in response to an initial position instruction signal from the test surface position adjustment/rotation instructing unit 56 to automatically align the measurement optical axis L with the rotation axis E. At the same time, the second two-axis adjusting stage portion 65 is driven to automatically align the rotation axis E with the outside diameter central axis D. When the measurement optical axis L is aligned with the rotation axis E and the rotation axis E is aligned with the outside diameter central axis D, the test surface 80 is disposed at the initial position.

In addition, the following method may be used to make the surface central axis C of the test surface 80 parallel to the measurement optical axis L: the measurement light from the interference optical system 2 is incident on the protruding portion 84 of the test lens 8; the two-dimensional image sensor 42 of the imaging system 4 for image capture at an initial position captures the interference fringes formed by interference between returning light from the upper surface 84a of the protruding portion 84 and the reference light; and the inclination of the test surface 80 is adjusted such that the captured interference fringe becomes a null fringe.

(3) Then, the rotating stage portion 64 is used to rotate the test surface 80 disposed at the initial position on the rotation axis E, and the interference optical system 2 radiates measurement light to the rotating test surface 80. Then, the two-dimensional image sensor 42 of the imaging system 4 for image capture at an initial position is used to capture the interference fringes at the initial position formed by the interference between the returning light from the concave surface portion 81 of the test surface 80 and the reference light at each of the rotational positions of the test surface 80.

(4) Then, the axis deviation calculating unit 54 calculates the deviation between the measurement optical axis L and the surface central axis C on the basis of each of the interference fringes at each initial position which are captured at a plurality of rotational positions. The outline of a method of calculating the deviation is as follows. That is, in the interference fringes at the initial position (concentric interference fringes having the surface central axis C as their centers) which are captured at a plurality of rotational positions, the surface central axis C deviates from the rotation axis E (in this stage, the rotation axis E is aligned with the outside diameter central axis D). Therefore, the interference fringes at the initial position are captured at different positions so as to draw a circular movement locus having the rotation axis E as the center. Thus, the radius of the movement locus is calculated from the image data of each of the interference fringes at the initial position, and the radius is the axis deviation.

(5) Then, the surface eccentricity calculating unit 55 calculates the surface eccentricity of the test surface 80 on the basis of the calculated axis deviation and the positional relationship between the measurement optical axis L and the outside diameter central axis D of the test lens 8 at the initial position. In this embodiment, when the test lens 8 is disposed at the initial position, the outside diameter central axis D is aligned with the measurement optical axis L. Therefore, the calculated axis deviation is the surface eccentricity.

(6) Then, the sample stage 6 is used to adjust the position of the test surface 80 relative to the measurement optical axis L such that the test surface 80 is disposed at the reference position where the surface central axis C is aligned with the measurement optical axis L. In this embodiment, the second two-axis adjusting stage portion 65 is driven in response to a pre-adjustment instruction signal output from the test surface position adjustment/rotation instructing unit 56 on the basis of the calculated axis deviation such that the surface central axis C is automatically aligned with the measurement optical axis L (in this stage, the surface central axis C is aligned with the rotation axis E).

(7) Then, a process of measuring the disk-shaped region $P_0$ set on the test surface 80 is performed as follows. That is, the measurement light is radiated to the test surface 80 at the reference position, and the two-dimensional image sensor 42 of the imaging system 4 for image capture at an initial position is used to capture the interference fringes (which include the shape information of the disk-shaped region $P_0$) formed by interference between the returning light reflected from the disk-shaped region $P_0$ on the test surface 80 and the reference light from the reference plane 24a of the flat reference plate 24. Then, the image data of the captured interference fringes is input to the shape analyzing unit 57. When fringe scanning measurement is performed, the fringe scan adapter 28 is used to appropriately change the position of the flat reference plate 24 in the direction of the measurement optical axis L, and the fringe scanning measurement is performed whenever the position is changed.

(8) Then, a method of measuring the annular region $P_1$ set on the test surface 80 is performed as follows.

<a> First, the sample stage 6 is used to change the position of the test surface 80 relative to the measurement optical axis L in the virtual plane including the measurement optical axis L and the surface central axis C such that the measurement optical axis L is vertical to the tangent plane of the test surface 80 at the intersection between the measurement optical axis L and the test surface 80 on the annular region $P_1$ (preferably, the center line of the width of the annular region $P_1$). In this embodiment, the first two-axis adjusting stage portion 61 and the tilting stage portion 62 are driven in response to a relative position changing instruction signal from the test surface position adjustment/rotation instructing unit 56 to automatically adjust the relative position of the test surface 80 (the second two-axis adjusting stage portion 65 is not driven and the aligned state between the surface central axis C and the rotation axis E is maintained).

<b> Then, the sample stage 6 is used to rotate the test surface 80 on the rotation axis E. In this embodiment, the rotating stage portion 64 is driven in response to a rotation instruction signal from the test surface position adjustment/ rotation instructing unit 56 to rotate the test surface 80 on the rotation axis E at a predetermined speed.

<c> Then, measurement light is radiated to the rotating test surface 80, and the one-dimensional image sensor 32 of the imaging system 3 for image capture during rotation is used to sequentially capture the interference fringes at each rotational position (which include the shape information of the annular region $P_1$ at each rotational position) formed by interference between the returning light reflected from the annular region $P_1$ and the reference light from the reference plane 24a of the flat reference plate 24 at a plurality of rotational positions of the test surface 80. The image data of the interference fringes is sequentially input to the shape analyzing unit 57. The interference fringes formed at each rotational position are concentric circles having the intersection of the measurement optical axis L and the annular region $P_1$ as their center. However, the image captured by the one-dimensional image sensor 32 is a dot sequence corresponding to an intersection region between the test surface 80 (annular region $P_1$) and the virtual plane including the measurement optical axis L and the surface central axis C in each interference fringe. When fringe scanning measurement is performed, the fringe scan adapter 28 is used to appropriately change the position of the flat reference plate 24 in the direction of the measurement optical axis L, and the interference fringe at each rotational position is captured whenever the position is changed.

(9) Next, the other annular regions $P_2$ to $P_7$ set on the test surface 80 are sequentially measured. The measuring method is the same as that for the annular region $P_1$. That is, the steps <a> to <c> of the process (8) for measuring the annular region $P_1$ may be sequentially performed to measure the annular regions $P_2$ to $P_7$.

(10) Then, the shape analyzing unit 57 calculates the shape information of the entire test surface 80 as follows.

<a> First, the shape analyzing unit 57 calculates the shape information of the disk-shaped region $P_0$ on the basis of the interference fringes including the shape information of the disk-shaped region $P_0$ that are captured by the two-dimensional image sensor 42 of the imaging system 4 for image capture at an initial position.

<b> Then, the shape analyzing unit 57 calculates the shape information of the entire annular region $P_1$ on the basis of the interference fringes of the annular region $P_1$ captured at each rotational position by the one-dimensional image sensor 32 of the imaging system 3 for image capture during rotation.

Specifically, for example, the shape analyzing unit 57 calculates the shape information of each partial region corresponding to the interference fringes at each rotational position in the coordinate system of the imaging system 3 for image capture during rotation, on the basis of the interference fringes captured at each rotational position around the rotation axis E, and arranges the shape information of each partial region while converting the shape information into information in a common coordinate system (for example, the coordinate system of the imaging system 4 for image capture at an initial position), thereby calculating the shape information of the entire annular region $P_1$. The coordinate conversion is performed on the basis of, for example, the following information: the angle formed between the rotation axis E and the measurement optical axis L when the image of the annular region $P_1$ is captured (an angle with respect to the tilting axis F: the angle is maintained at a constant value (for example, $\theta_1$) while the image of the interference fringes of the annular region $P_1$ is captured at each rotational position); the rotation angle with respect to the rotation axis E when the image of the interference fringes is captured at each rotational position (the angle of the interference fringe at each rotational position depends on the imaging timing); and the position of the annular region $P_1$ relative to the rotation axis E (each component in the directions that are vertical to and parallel to the rotation axis E at the distance from the intersection between the rotation axis E and the test surface 80 to the center line of the annular region $P_1$ in the width direction).

<c> Then, similarly, the shape analyzing unit 57 calculates the shape information of each of the annular regions $P_2$ to $P_7$ on the basis of the interference fringes of each of the annular regions $P_2$ to $P_7$ captured at each rotational position by the one-dimensional image sensor 32 of the imaging system 3 for image capture during rotation.

Specifically, the same process as described above may be performed while sequentially replacing the annular region $P_1$ with the annular regions $P_2$ to $P_7$ (the angle $\theta_1$ may also be sequentially replaced with the angles $\theta_2$ to $\theta_7$).

<d> Then, the shape analyzing unit 57 connects the shape information of each annular region to calculate the shape information of a combined region of a plurality of annular regions $P_1$ to $P_7$, and composes the calculated shape information with the shape information of the disk-shaped region $P_0$ to calculate the shape information of the entire test surface 80.

A known aperture composition method may be used to connect the shape information of the annular regions $P_1$ to $P_7$ and compose (connect) the shape information with the shape information of the disk-shaped region $P_0$. That is, the shape information of the annular regions $P_1$ to $P_7$ and the shape information of the disk-shaped region $P_0$ have already been converted into information in the common coordinate system (the coordinate system of the imaging system 4 for image capture at an initial position). Therefore, when the error of positional information peculiar to the shape information (for example, information such as the angle formed between the measurement optical axis L and the rotation axis E when the image of the interference fringes is captured) is negligible, it is possible to calculate the shape information of the entire test surface 80 by arranging the shape information of the annular regions $P_1$ to $P_7$ and the shape information of the disk-shaped region $P_0$ on the basis of the positional information of each region (in this case, it is not necessary to set an overlap region between the disk-shaped region $P_0$ and the annular region $P_1$ or between two adjacent regions among the annular regions $P_1$ to $P_7$).

On the other hand, when the error of the positional information peculiar to the shape information is not negligible, it is necessary to correct the error. For example, in the case in which there is a relative error $\Delta\theta$ between the information of the angle $\theta_1$ formed between the measurement optical axis L and the rotation axis E when the image of the annular region $P_1$ is captured and the information of the angle $\theta_2$ formed between the measurement optical axis L and the rotation axis E when the image of the annular region $P_2$ is captured, when the shape information of the annular region $P_1$ and the shape information of the annular region $P_2$ are arranged without any change on the basis of the positional information of the regions (information of the angles $\theta_1$ and $\theta_2$) and are then connected to each other, an unnecessary overlap region is obliquely formed between the annular region $P_1$ and the annular region $P_2$. Therefore, it is necessary to perform the connection process after correcting the error $\Delta\theta$.

For example, the error $\Delta\theta$ is corrected as follows. First, an overlap region (hereinafter, referred to as an 'overlap region') is set between the annular region $P_1$ and the annular region $P_2$. Then, the shape information of the overlap region calculated on the basis of the positional information of the annular region $P_1$ is compared with the shape information of the overlap region calculated on the basis of the positional information of the annular region $P_2$ (the shape information items should be identical to each other) to calculate the error $\Delta\theta$, and the inverse value of the positive or negative value of the calculated error $\Delta\theta$ is added to the positional information of the annular region $P_2$ to correct the positional information. Then, the shape information of each partial region corresponding to the interference fringes of the annular region $P_2$ at each rotational position is rearranged on the basis of the corrected positional information. When the shape information of the overlap region calculated on the basis of the positional information of the annular region $P_1$ is compared with the shape information of the overlap region calculated on the basis of the positional information of the annular region $P_2$, a shape obtained by fitting the shape of each overlap region using, for example, a higher-order polynomial or an aspheric expression may be used.

Although the embodiment of the invention has been described in detail above, the invention is not limited to the above-described embodiment, but various modifications and changes of the invention can be made.

For example, in the above-described embodiment, the method of measuring the disk-shaped region $P_0$ is different from the method of measuring the annular regions $P_1$ to $P_7$. However, similar to the measurement of the annular regions $P_1$ to $P_7$, while the test surface 80 disposed at the reference position is rotated on the rotation axis E, the one-dimensional image sensor 32 of the imaging system 3 for image capture during rotation may capture the interference fringes at each rotational position, and the shape information of the disk-shaped region $P_0$ may be calculated on the basis of the interference fringes at each rotational position. In this case, it is possible to treat the disk-shaped region $P_0$ as one annular region.

In the above-described embodiment, the test surface 80 includes the concave surface portion 81 and the convex surface portion 82, but a measurement target is not limited to the test surface having the above-mentioned shape. The optical wave interference measuring apparatus according to the invention may be used to measure various shapes of test surfaces that are rotationally symmetric.

What is claimed is:

1. An optical wave interference measuring apparatus for measuring the shape of a rotationally symmetric test surface of a test object arranged on a measurement optical axis, comprising:

a test surface position adjusting unit that sequentially changes the position of the test surface relative to the measurement optical axis from a reference position where a surface central axis of the test surface is aligned with the measurement optical axis such that an intersection between the measurement optical axis and the test surface is sequentially moved to a plurality of annular regions obtained by dividing the test surface in a diametric direction in a virtual plane including the measurement optical axis and the surface central axis and the measurement optical axis is perpendicular to the tangent plane of the test surface at the intersection whenever the intersection is moved;

a test surface rotating unit that rotates the test surface on a rotation axis with the surface central axis aligned with the rotation axis, whenever the relative position is changed;

an interference optical system that radiates measurement light, which is composed of a plane wave and travels along the measurement optical axis, to the rotating test surface and mixes reference light and returning light from the test surface to obtain interference light;

an imaging system for image capture during rotation that captures the interference light at a plurality of rotational positions of the rotating test surface and uses a one-dimensional image sensor to capture an interference fringe at each rotational position which corresponds to an intersection region between the virtual plane and the test surface in each of the plurality of annular regions; and a shape analyzing unit that calculates shape information of each of the plurality of annular regions on the basis of the interference fringe at each rotational position and connects the shape information of each of the annular regions to calculate shape information of the entire combined region of the plurality of annular regions.

2. The optical wave interference measuring apparatus according to claim 1, further comprising:

a holding unit that holds the test object at an initial position where the measurement optical axis is aligned with the rotation axis and the surface central axis is parallel to the measurement optical axis;

an imaging system for image capture at the initial position that captures the interference fringes at the initial position, which are formed when the test surface rotating unit rotates the test surface disposed at the initial position on the rotation axis and the interference optical system radiates the measurement light to the rotating test surface such that the reference light interferes with the returning light from the test surface, at the plurality of rotational positions of the test surface;

an axis deviation measuring unit that calculates a deviation between the measurement optical axis and the surface central axis on the basis of the interference fringes at the initial position which are captured at the plurality of rotational positions; and a test surface position pre-adjusting unit that adjusts the position of the test surface relative to the measurement optical axis such that the test surface is disposed at the reference position, on the basis of the calculated axis deviation.

3. The optical wave interference measuring apparatus according to claim 2, further comprising:

a surface eccentricity measuring unit that calculates the surface eccentricity of the test surface on the basis of the positional relationship between the measurement optical axis and an outside diameter central axis of the test object disposed at the initial position and the axis deviation calculated by the axis deviation measuring unit.

4. The optical wave interference measuring apparatus according to claim 1, wherein the test surface position adjusting unit includes a tilting unit that tilts the test surface on a tilting axis perpendicular to the virtual plane.

5. The optical wave interference measuring apparatus according to claim 1, wherein the interference optical system includes a light source unit that emits high-coherence beams, a collimator lens that collimates the light emitted from a beam branching optical element, and a flat reference plate that retro-reflects a portion of the plane wave emitted from the collimator lens from a reference plane to obtain reference light and transmits the other portion of the plane wave as measurement light along a measurement optical axis.

* * * * *